United States Patent
Rimell

(10) Patent No.: US 12,547,989 B2
(45) Date of Patent: Feb. 10, 2026

(54) MAINTENANCE MANAGEMENT OF A PROPULSION SYSTEM

(71) Applicant: ROLLS-ROYCE plc, London (GB)

(72) Inventor: Andrew Rimell, Derby (GB)

(73) Assignee: Rolls-Royce plc, London (GB)

( * ) Notice: Subject to any disclaimer, the term of this patent is extended or adjusted under 35 U.S.C. 154(b) by 307 days.

(21) Appl. No.: 18/325,360

(22) Filed: May 30, 2023

(65) Prior Publication Data
US 2023/0401544 A1     Dec. 14, 2023

(30) Foreign Application Priority Data
Jun. 13, 2022   (GB) .................................... 2208601

(51) Int. Cl.
| | |
|---|---|
| *G06Q 30/00* | (2023.01) |
| *G06F 40/10* | (2020.01) |
| *G06F 40/40* | (2020.01) |
| *G06Q 10/20* | (2023.01) |

(52) U.S. Cl.
CPC ............ *G06Q 10/20* (2013.01); *G06F 40/10* (2020.01); *G06F 40/40* (2020.01)

(58) Field of Classification Search
None
See application file for complete search history.

(56) References Cited

U.S. PATENT DOCUMENTS

| | | | | |
|---|---|---|---|---|
| 10,239,640 B2 * | 3/2019 | Ethington | ............ | G07C 5/0841 |
| 10,417,614 B2 * | 9/2019 | Johnson | ................ | G05B 13/041 |
| 10,928,817 B2 * | 2/2021 | Spiro | ..................... | G06Q 10/06 |
| 2017/0124780 A1 * | 5/2017 | Jensen | ................... | G07C 5/008 |
| 2017/0166328 A1 * | 6/2017 | Ethington | .............. | G06Q 10/20 |
| 2017/0217606 A1 * | 8/2017 | Fisher | .................... | G06Q 10/20 |
| 2017/0278420 A1 * | 9/2017 | João Viol Vieira | .. | A61B 5/4504 |

(Continued)

OTHER PUBLICATIONS

Intelligent Fault Diagnosis for Planetary Gearbox Using Time-Frequency Representation and Deep Reinforcement Learning; IEEE XPLORE; Publication Date: Apr. 1, 2022; Published in: IEEE/ASME Transactions on Mechatronics (vol. 27, Issue: 2, 2022, pp. 985-998) Authors: Hui Wang • Jiawen Xu • Chuan (Year: 2022).*

(Continued)

*Primary Examiner* — Matthew T Sittner
(74) *Attorney, Agent, or Firm* — Shumaker & Sieffert, P.A.

(57) ABSTRACT

A method for facilitating maintenance management of a propulsion system, such as an engine, for a vehicle is disclosed. The method comprises obtaining, for each of a plurality of propulsion systems, records of maintenance events experienced by the propulsion system, and records of traversals of transport routes by the propulsion system during a period of propulsion system operation. The method further comprises using a Machine Learning model to classify the recorded maintenance events into a plurality of maintenance categories. The method then comprises identifying, from the classified recorded maintenance events and the records of traversals of transport routes, a correlation between a given maintenance category and the transport routes traversed by propulsion systems during operational periods preceding maintenance events classified into the maintenance category. The correlation may be used in maintenance and/or route planning for propulsion systems.

19 Claims, 21 Drawing Sheets

(56) References Cited

U.S. PATENT DOCUMENTS

| | | | | |
|---|---|---|---|---|
| 2017/0323274 A1* | 11/2017 | Johnson | ............... | G05B 13/041 |
| 2018/0173216 A1* | 6/2018 | Spiro | ..................... | G06Q 10/20 |
| 2019/0011931 A1* | 1/2019 | Selvam | ................ | G05D 1/0088 |
| 2019/0156298 A1* | 5/2019 | Ethington | ............ | G06N 3/0499 |
| 2019/0164358 A1* | 5/2019 | Hanov | ............... | G06Q 10/1097 |
| 2019/0317480 A1* | 10/2019 | Shetty | ................... | G06Q 10/06 |
| 2020/0380958 A1* | 12/2020 | Srinivasan | ............... | G08G 5/76 |
| 2021/0090445 A1* | 3/2021 | Molnar | .................... | G08G 5/76 |
| 2022/0027762 A1* | 1/2022 | Leitch | ...................... | B64F 5/40 |
| 2022/0306305 A1* | 9/2022 | Cottrell | ............... | B64D 35/021 |
| 2022/0317678 A1* | 10/2022 | Erriquez | ............ | G05B 23/0283 |
| 2022/0326703 A1* | 10/2022 | Raje | .................. | G05B 23/0283 |
| 2022/0398638 A1* | 12/2022 | Saijo | ................. | G06Q 30/0202 |

OTHER PUBLICATIONS

European search report dated Oct. 19, 2023 issued in EP Patent Application No. 23174431.9.
Great Britain search report dated Dec. 9, 2022, issued in GB Patent Application No. 2208601.1.
Response to Extended Search Report dated Oct. 30, 2023, from counterpart European Application No. 23174431.9 filed Jun. 13, 2024, 68 pp.

* cited by examiner

| Event No | Maintenance ID | Serial No | Date | Operator | Aircraft | Topic | Topic description | Topic Probability |
|---|---|---|---|---|---|---|---|---|
| E1332473 | M3264020 | SN6193 | 23/06/2002 | Airline_01 | A01-AAB | Topic_1 | Compressor damage | 0.8450 |
| E2975504 | M3890461 | SN7962 | 03/10/2021 | Airline_02 | A02-ZZZ | Topic_3 | Turbine damage | 0.8540 |
| E8736087 | M2826118 | SN1382 | 28/08/2003 | Airline_01 | A01-AAC | Topic_1 | Compressor damage | 0.7810 |
| E2848809 | M3364610 | SN3054 | 09/06/2016 | Airline_02 | A02-ZZY | Topic_4 | Life expired parts | 0.7480 |
| E6606017 | M7624447 | SN4368 | 09/07/2011 | Airline_03 | A03-RST | Topic_2 | Oil leak | 0.7710 |
| E3551942 | M1718145 | SN8808 | 16/06/2000 | Airline_01 | A01-AAB | Topic_5 | High vibration | 0.9130 |
| E2213933 | M1599575 | SN4835 | 24/06/2021 | Airline_01 | A01-AAD | Topic_4 | Life expired parts | 0.7250 |
| E8167055 | M5935707 | SN6136 | 09/04/2017 | Airline_02 | A02-ZZY | Topic_4 | Life expired parts | 0.9490 |

Fig. 7

| Topic | Route | Count | Score |
|---|---|---|---|
| Compressor damage | A-B | 145 | 111.83 |
| Life expired parts | A-B | 1939 | 1797.96 |
| Oil leak | A-C | 303 | 255.44 |
| Compressor damage | A-C | 18 | 15.86 |
| Turbine damage | A-C | 5684 | 4667.17 |
| High vibration | C-D | 420 | 368.15 |
| Life expired parts | C-D | 36 | 32.91 |

Fig. 10

| Route | Compressor damage | Life expired parts | Oil leak | Vibration | Turbine damage | Compressor damage% | Life expired parts% | Oil leak% | Vibration% | Turbine damage% | Max% |
|---|---|---|---|---|---|---|---|---|---|---|---|
| A-D | 0.00 | 0.96 | 0.00 | 0.00 | 0.00 | 0.00 | 100.00 | 0.00 | 0.00 | 0.00 | Life expired parts |
| B-C | 0.00 | 0.00 | 1.47 | 0.70 | 0.00 | 0.00 | 0.00 | 67.76 | 32.24 | 0.00 | Oil leak |
| B-F | 375.60 | 2425.98 | 372.28 | 1064.59 | 4667.17 | 4.22 | 27.24 | 4.18 | 11.95 | 52.41 | Turbine damage |
| C-F | 108.39 | 457.91 | 17.32 | 495.72 | 16.66 | 9.89 | 41.78 | 1.58 | 45.23 | 1.52 | Vibration |
| D-E | 0.00 | 2.11 | 0.00 | 0.00 | 5.89 | 0.00 | 26.42 | 0.00 | 0.00 | 73.58 | Turbine damage |
| F-G | 0.00 | 9.22 | 25.39 | 33.39 | 0.00 | 0.00 | 13.56 | 37.34 | 49.10 | 0.00 | Vibration |

Fig. 11

| Airport | Compressor damage % | Life expired parts % | Oil leak % | Vibration % | Turbine damage % |
|---|---|---|---|---|---|
| A | 0.000 | 0.000 | 0.000 | 0.000 | 100.000 |
| A | 0.000 | 0.000 | 21.981 | 78.019 | 0.000 |
| A | 0.000 | 0.000 | 26.115 | 21.654 | 52.231 |
| A | 0.000 | 0.000 | 0.000 | 100.000 | 0.000 |
| A | 25.388 | 0.000 | 0.000 | 74.612 | 0.000 |
| A | 0.000 | 0.000 | 0.000 | 100.000 | 0.000 |
| A | 0.000 | 48.789 | 51.211 | 0.000 | 0.000 |
| A | 0.000 | 48.789 | 51.211 | 0.000 | 0.000 |
| A | 100.000 | 0.000 | 0.000 | 0.000 | 0.000 |

Fig. 13

| Airport | Compressor damage % | Life expired parts % | Oil leak % | Vibration % | Turbine damage % |
|---|---|---|---|---|---|
| A | 13.932 | 16.915 | 16.724 | 41.587 | 10.842 |
| B | 33.987 | 24.222 | 6.116 | 9.782 | 25.893 |
| C | 0.000 | 0.000 | 0.000 | 50.000 | 50.000 |
| D | 9.378 | 33.185 | 16.333 | 22.595 | 18.509 |
| E | 0.000 | 0.000 | 0.000 | 0.000 | 100.000 |
| F | 0.000 | 0.000 | 0.000 | 100.000 | 0.000 |
| G | 6.906 | 36.458 | 39.944 | 0.000 | 16.693 |
| H | 8.641 | 7.489 | 10.784 | 22.957 | 50.130 |
| I | 59.429 | 4.086 | 11.188 | 12.639 | 12.657 |
| J | 0.000 | 0.000 | 0.000 | 100.000 | 0.000 |
| K | 23.492 | 7.505 | 28.884 | 19.394 | 20.725 |
| L | 6.248 | 13.782 | 10.766 | 18.386 | 50.818 |

Fig. 14

MAINTENANCE MANAGEMENT OF A PROPULSION SYSTEM

CROSS-REFERENCE TO RELATED APPLICATIONS

This specification is based upon and claims the benefit of priority from United Kingdom patent application number GB 2208601.1 filed on Jun. 13, 2022, the entire contents of which is incorporated herein by reference.

BACKGROUND

Technical Field

The present disclosure relates to a method for facilitating maintenance management of a propulsion system for a vehicle. The method may be performed by a management node, and the present disclosure also relates to a management node and to a computer program product configured, when run on a computer, to carry out a method for facilitating maintenance management of a propulsion system for a vehicle.

Description of the Related Art

Maintenance of vehicle propulsion systems, including for example gas turbine engines, jet engines, electrical engines, etc., is crucial for ensuring the safety of such systems over their operational lifetime. Maintenance may be carried out to address specific issues relating to one or more component parts of the system, to replace components coming to the end of their planned operational life, and/or following a notification, fault warning or other indication relating to system performance or monitoring.

Withdrawing a propulsion system from operation to undergo maintenance activities imposes significant operational consequences, both in terms of cost, and for operational planning relating to the vehicles in which the system is used. Various solutions have been proposed to assist with managing operation and maintenance activities for such systems, with a view to minimizing maintenance activities and their associated operational consequences.

In one example solution, U.S. Pat. No. 10,417,614 discloses a system in which a computer model of an engine, referred to as a digital twin, is used to predict damage for the purposes of operational optimization. In another example, US discloses a system in which maintenance records for a given engine are used to predict future events which may require maintenance activities to be carried out on the engine.

Existing methods thus offer differing approaches to predicting engine damage and maintenance requirements. However, minimizing the operational consequences associated with engine maintenance, either through management of the engine itself and/or through management of the maintenance activities, remains an ongoing challenge.

SUMMARY

It is an aim of the present disclosure to provide a method, a management node, and a computer program product which at least partially address one or more of the challenges mentioned above. It is a further aim of the present disclosure to provide a method, a management node, and a computer program product which cooperate to facilitate maintenance management for a propulsion system by identifying a correlation between transport routes traversed by a propulsion system, and the type of maintenance activities carried out on such a system.

According to a first aspect of the present disclosure, there is provided a computer implemented method for facilitating maintenance management of a propulsion system for a vehicle. The method comprises obtaining, for each of a plurality of propulsion systems, records of maintenance events experienced by the propulsion system, and records of traversals of transport routes by the propulsion system during a period of propulsion system operation. The method further comprises using a Machine Learning (ML) model to classify the recorded maintenance events into a plurality of maintenance categories. The method further comprises identifying, from the classified recorded maintenance events and the records of traversals of transport routes, a correlation between a given maintenance category and the transport routes traversed by propulsion systems during operational periods preceding maintenance events classified into the maintenance category.

Using an ML model to classify the records of maintenance events into a plurality of maintenance categories may comprise using the ML model to generate, for each recorded maintenance event, an identification of the maintenance category into which the maintenance event is classified, and a probability associated with the classification.

The probability associated with the classification may comprise a probability that the identified maintenance category is the correct maintenance category for the recorded maintenance event.

The correlation may be expressed as a probability that a causal link exists between traversing a given transport route and the next maintenance event for a propulsion system being in a given maintenance category.

The method may further comprise pre-processing the obtained records of maintenance events by, for each record of a maintenance event: filtering the record to retain only the content of at least one free text field of the record; and concatenating free text from the retained content to form a document.

The method may further comprise obtaining a number of maintenance categories into which the records of maintenance events are to be classified.

Obtaining a number of maintenance categories into which the records of maintenance events are to be classified may comprise using an iterative process to identify a number that results in no overlap between maintenance categories following classification of the obtained maintenance records by the ML model.

Using an ML model to classify the records of maintenance events into a plurality of maintenance categories may comprise using the ML model to perform, for each recorded maintenance event: generation of a probability that the recorded maintenance event belongs to each of the maintenance categories; and classification of the recorded maintenance event into the maintenance category associated with the highest generated probability.

The method may further comprise obtaining a name for each maintenance category.

The ML model may comprise a Natural Language Processing, NLP, model.

The ML model may comprise Latent Dirichlet Allocation, LDA.

Identifying, from the classified recorded maintenance events and the records of traversals of transport routes, a correlation between a given maintenance category and the transport routes traversed by propulsion systems during operational periods preceding maintenance events classified into the maintenance category may comprise: for each record of a traversal of a transport route, associating the record with the next maintenance event experienced by the propulsion system after that traversal, and with the maintenance category into which that maintenance event is classified; and for each combination of transport route and maintenance category: calculating the total number of traversals of the transport route that are associated with the maintenance category; and calculating a combination score comprising the sum of the probabilities associated with the classifications of the maintenance events that are associated with the traversals.

Identifying, from the classified recorded maintenance events and the records of traversals of transport routes, a correlation between a given maintenance category and the transport routes traversed by propulsion systems during operational periods preceding maintenance events classified into the maintenance category may further comprise: for each transport route: calculating the percentage contribution to a total score for the route of the combination scores for each of the maintenance categories combined with that route; identifying the maintenance category with the highest percentage contribution; and calculating a margin comprising a difference between the highest percentage contribution and the second highest percentage contribution.

Identifying, from the classified recorded maintenance events and the records of traversals of transport routes, a correlation between a given maintenance category and the transport routes traversed by propulsion systems during operational periods preceding maintenance events classified into the maintenance category may further comprise: associating each transport route to the identified maintenance category, wherein a strength of the association is proportional to the calculated margin for the transport route.

Identifying, from the classified recorded maintenance events and the records of traversals of transport routes, a correlation between a given maintenance category and the transport routes traversed by propulsion systems during operational periods preceding maintenance events classified into the maintenance category may further comprise: before associating transport routes to identified maintenance categories, filtering out transport routes for which at least one of: the total number of traversals of the route, or the calculated margin is below a respective threshold value.

The method may further comprise plotting the identified correlation on at least one geographic plot.

Each transport route may comprise an origin location and a destination location, the method may further comprise: for a given location: identifying all of the transport routes for which the location is either an origin or a destination; for each maintenance category, calculating a percentage contribution of the maintenance category to a location score for the location as an average of the calculated percentage contributions of that maintenance category to the total scores of the identified routes; identifying the maintenance category with the highest percentage contribution; calculating a margin comprising the difference between the highest percentage contribution and the second highest percentage contribution; and associating the location to the identified maintenance category, wherein a strength of the association is proportional to the calculated margin for the location.

The method may further comprise using the identified correlation to perform at least one of: maintenance planning; transport route planning; material selection; component part design; for a propulsion system.

According to another aspect of the present disclosure, there is provided a computer program product comprising a computer readable non-transitory medium, the computer readable medium having computer readable code embodied therein, the computer readable code being configured such that, on execution by a suitable computer or processor, the computer or processor is caused to perform a method according to any one of the aspects or examples of the present disclosure.

According to another aspect of the present disclosure, there is provided a management node for facilitating maintenance management of a propulsion system for a vehicle. The management node comprises processing circuitry and a memory, the memory containing instructions executable by the processor whereby the management node is operative to obtain, for each of a plurality of propulsion systems, records of maintenance events experienced by the propulsion system, and records of traversals of transport routes by the propulsion system during a period of propulsion system operation. The management node is further operative to use a Machine Learning (ML) model to classify the recorded maintenance events into a plurality of maintenance categories. The management node is further operative to identify, from the classified recorded maintenance events and the records of traversals of transport routes, a correlation between a given maintenance category and the transport routes traversed by propulsion systems during operational periods preceding maintenance events classified into the maintenance category.

The management node may be further operative to carry out the method as described in any of the preceding paragraphs of the brief summary.

Aspects of the present disclosure thus provide a method and management node according to which maintenance data for propulsion systems is used to establish geographical areas of operation which are most likely to result in specific types of maintenance. In particular, an ML model is used to extract maintenance category information from entries in maintenance records. The records may be combined with records of transport routes traversed by the maintained propulsion systems to give a measure of probability of a causal link between a given transport route and a given category of maintenance activities. Such a link may arise as a result of environmental factors encountered along the transport route, including for example pollution and other contaminants such as those generated by volcanic or other natural activity. In some examples, as discussed below, a correlation or association may also be identified between individual origin or destination locations for transport routes, and category of maintenance activities. In some examples, geographic plots may be generated for combinations of transport route and type of propulsion system, so as to assist with maintenance management, for example through maintenance planning, transport route planning for vehicles powered by propulsion systems, material selection for propulsion systems and/or component part design for such systems.

BRIEF DESCRIPTION

For a better understanding of the present disclosure, and to show more clearly how it may be carried into effect, reference will now be made, by way of example, to the following drawings in which:

FIG. 7 illustrates example maintenance report data with corresponding maintenance categories;

FIGS. 10 and 11 illustrate example subsets of combined data;

FIG. 13 shows maintenance data from the example implementation by airport;

FIG. 14 shows maintenance categories by airport; and

DETAILED DESCRIPTION

As discussed above, example methods according to the present disclosure can facilitate maintenance management by helping to understand which transport routes may be associated with which types of maintenance of the propulsion systems used to travel such routes. This may help to identify which transport routes are the most expensive in terms of maintenance, as well as informing maintenance planning, component design, route planning, operational planning such as load sharing of particularly taxing routes between propulsion systems, etc. This insight regarding transport routes and maintenance types is obtained through correlation of maintenance records for propulsion systems with records of transport routes travelled by those systems.

Maintenance reports generally comprise information describing work carried out on a propulsion system such as an engine. This information may be present at various levels of detail, and may include a description of the nature of the maintenance, for example component repair or replacement, the reason for the maintenance, and occasionally a description of the event which necessitated the maintenance. Using an ML model, which may in some examples be a Natural Language Processing (NLP) model, examples of the present disclosure can infer the reason for a particular maintenance activity as belonging to one of a number of categories. In seeking to understand the context of recorded maintenance activities, examples of the methods discussed herein are able to differentiate between a component that is replaced following damage, and a component that is replaced at the end of its anticipated or planned operational life. This level of insight is often not available from viewing only a schedule of work carried out.

Having identified and classified a reason for maintenance activities carried out on a particular propulsion system, examples of the present disclosure are able to associate that reason with the transport routes travelled by the system in the period prior to the maintenance activities. By repeating this association for a plurality of systems, a correlation can be identified between transport routes and maintenance categories.

Figure 1:
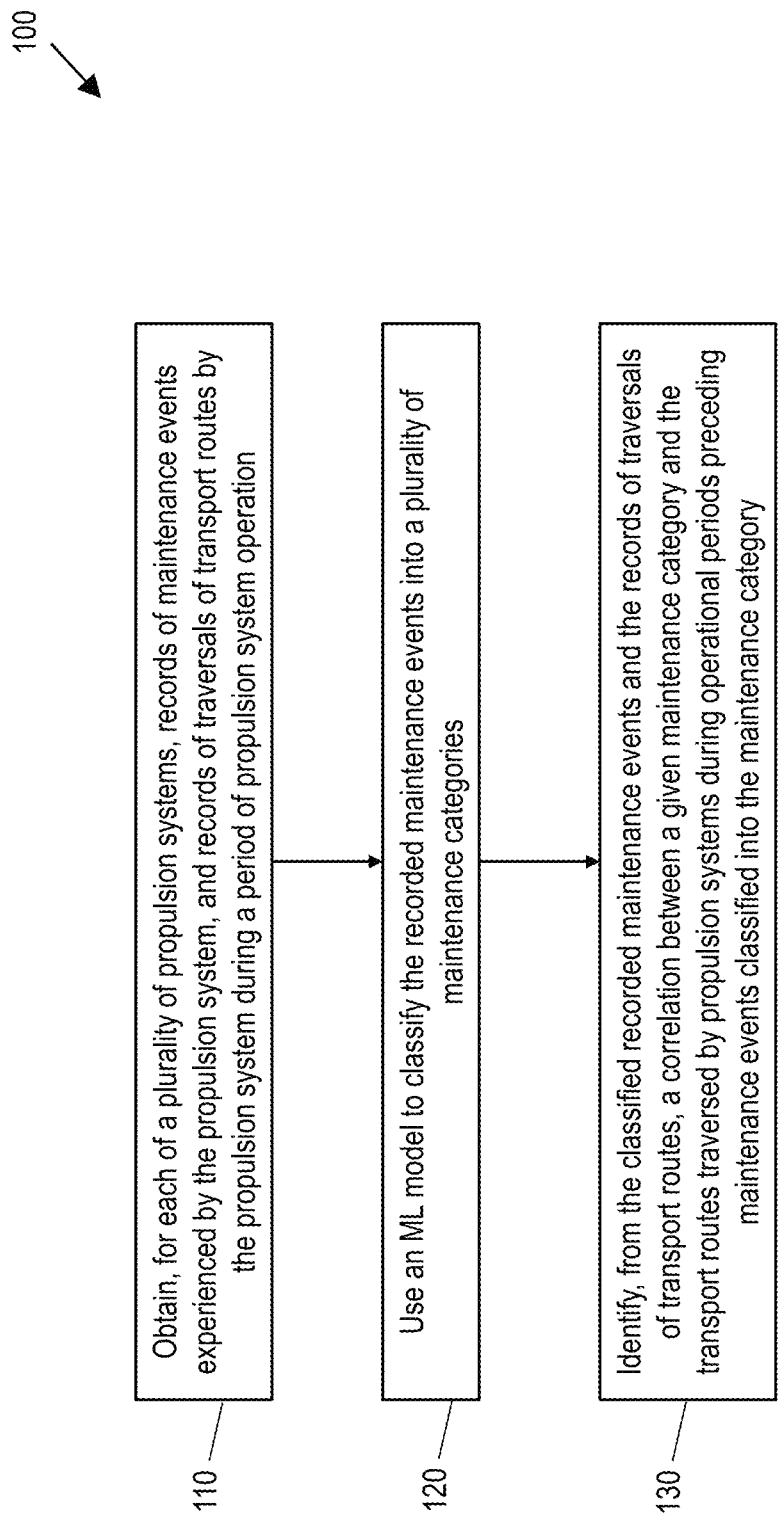
FIG. 1 is a flow chart illustrating process steps in a computer implemented method for facilitating maintenance management of a propulsion system for a vehicle.

FIG. 1 is a flow chart illustrating process steps in a computer implemented method 100 for facilitating maintenance management of a propulsion system for a vehicle. The method 100 may be performed by a management node, which may comprise a physical or virtual node, and may be implemented in a computer system, computing device or server apparatus and/or in a virtualized environment, for example in a cloud, edge cloud or fog deployment. Examples of a virtual node may include a piece of software or computer program, a code fragment operable to implement a computer program, a virtualised function, or any other logical entity.

Referring to FIG. 1, the method 100 comprises, in a first step 110, obtaining, for each of a plurality of propulsion systems, records of maintenance events experienced by the propulsion system, and records of traversals of transport routes by the propulsion system during a period of propulsion system operation. The method 100 further comprises using a Machine Learning (ML), model to classify the recorded maintenance events into a plurality of maintenance categories. The method 100 further comprises identifying, from the classified recorded maintenance events and the records of traversals of transport routes, a correlation between a given maintenance category and the transport routes traversed by propulsion systems during operational periods preceding maintenance events classified into the maintenance category.

It will be appreciated that the propulsion systems for which records are obtained may comprise any type of propulsion system suitable for powering a vehicle. For example, the propulsion systems may comprise gas turbine engines, jet engines, electrical motors, batteries, fuel cells, etc. Vehicles powered by such systems may include aircraft, ships, boats and other ocean going vessels, and/or land vehicles.

According to examples of the method 100, the number of propulsion systems for which records are obtained, and the number of maintenance records obtained, may each be above a particular threshold value, in order to ensure a large enough dataset to be able to identify a valid correlation. The exact value of such thresholds will depend to some extent on the content of the data, but as a general rule a greater amount of data is expected to improve the strength and usefulness of the correlations identified. An input corpus (set of maintenance records) with of the order of thousands of records is expected to perform well.

For the purposes of the present disclosure, a "maintenance event" may be understood as the temporary removal of a propulsion system from service, during which removal one or more maintenance activities are carried out on the propulsion system. Each maintenance event has its own associated record detailing the maintenance activities carried out on the propulsion system during that event.

Also for the purposes of the present disclosure, it will be appreciated that an ML model is considered to comprise the output of a Machine Learning algorithm or process, wherein an ML process comprises instructions through which data may be used to generate a model artefact for performing a given task, or for representing a real world process or system. An ML model is the model artefact that is created by such a procedure, and which comprises the computational architecture that performs the task.

FIGS. 2a to 2g show flow charts illustrating another example of a method 200 for facilitating maintenance management of a propulsion system for a vehicle. As for the method 100, the method 200 may be performed by a management node, which may comprise a physical or virtual node, as discussed above with reference to the method 100. The method 200 illustrates examples of how the steps of the method 100 may be implemented and supplemented to provide the above discussed and additional functionality. The discussion of terms and expressions provided above with reference to the method 100 may be assumed to apply equally to the corresponding terms and expressions in the following discussion of the method 200.

Figure 2A:
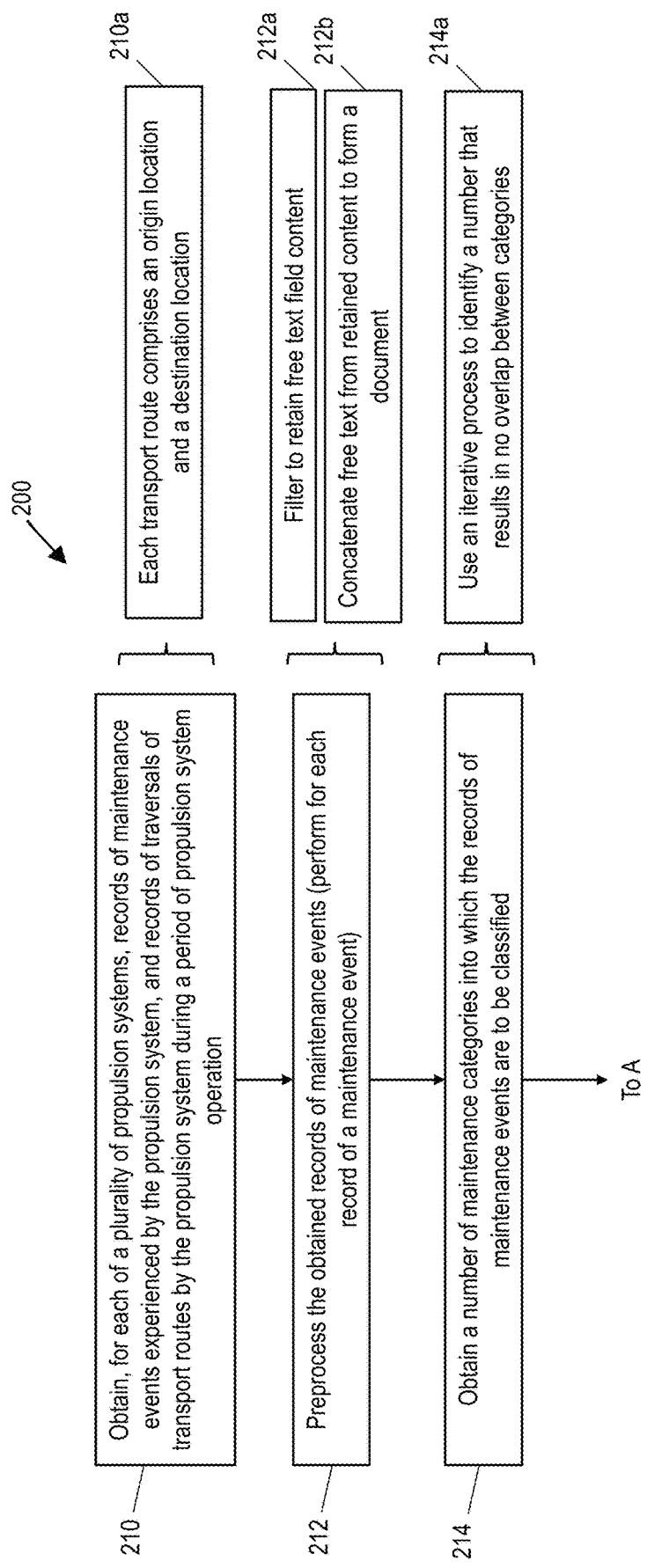
FIGS. 2a to 2g show a flow chart illustrating process steps in another example of a computer implemented method for facilitating maintenance management of a propulsion system for a vehicle.

Referring initially to FIG. 2a, in a first step 210, the method 200 comprises obtaining, for each of a plurality of propulsion systems, records of maintenance events experienced by the propulsion system, and records of traversals of transport routes by the propulsion system during a period of propulsion system operation. As illustrated at 210a, each transport route may comprise an origin location and a destination location. Origin and destination locations may for example comprise airports, for aerial transport routes, or ports, for maritime transport routes.

Transport routes may be directional, with separate routes existing from location A to location B, and from location B to location A. Directional transport routes are commonly found in commercial air travel and sea travel, to account for varying factors including prevailing winds, sea currents, and general management of crowded commercial air and shipping routes. Variation in environmental factors encountered in the different geographical paths followed from location A to location B, and from location B to location A may be captured through the use of directional transport routes in the method 200. In other examples, transport routes may be non-directional in nature. In some examples, non-directional transport routes may facilitate plotting of the routes, as discussed below.

It will be appreciated that a distinction may be made between a transport route, which may be defined by the two (or more) locations between which the route extends, and a record of a traversal of a transport route. With reference to aircraft, this may equate to the distinction between flight routes or flight paths, and the number of recorded flights over a particular flight route or flight path.

The period of propulsion system operation for which the transport records and maintenance records are obtained may in some examples be the full operational life of the propulsion systems to date, i.e., since the initial entry into service of each propulsion system. Alternatively, some other operational period may be selected, for example to take account of changes to transport routes, or other factors.

In step 212, the method 200 may comprise pre-processing the obtained records of maintenance events in step 212. This may comprise, for each record of a maintenance event, filtering the record to retain only the content of at least one free text field of the record in step 212a, and concatenating free text from the retained content to form a document in step 212b. In some examples, retaining only the content of at least one free text field may offer the technical advantage of improving the subsequent classification, as the inventors of the present disclosure have determined that the most relevant information relating to the reason for a maintenance event can generally be found in these fields. As discussed above, the reason for a maintenance event can offer greater context to the event than merely what maintenance work was carried out, distinguishing for example between component replacement because of damage, and normal programmed component replacement at the end of a planned operational life. In some examples, the filtering step 212a may retain only the content of one or both of the "removal reason" and/or "event life/description" fields of the maintenance event records.

According to some examples of the present disclosure, the pre-processing at step 212 may further comprise any one or more of:

Converting text to lower-case
Removing non-alpha-numeric characters
Removing words containing numbers and/or removing numbers from words containing numbers
Removing commonly occurring words that are unlikely to add meaning (commonly referred to as stop-words)
Lemmatizing or stemming the text
Finding bi-grams and tri-grams.

In step 214, the method 200 comprises obtaining a number of maintenance categories into which the records of maintenance events are to be classified. This step refers to obtaining the number, that is into how many categories the records should be classified, as opposed to obtaining the categories themselves. The categories are identified by the model as a consequence of the data during the classification process. Obtaining the number of categories may comprise, as illustrated in step 214a, using an iterative process to identify a number of maintenance categories that results in no overlap between maintenance categories following classification of the obtained maintenance records by the ML model. In some example implementations, this may for example comprise selecting a number of maintenance categories, classifying the maintenance records using the ML mode by implementing step 220 of the method, determining whether any overlap between categories exists (i.e., records belonging to more than one category), and, if overlap does exist, incrementing the number of categories and repeating the classification and determining steps until the overlap is removed.

In some examples the method 200 may further comprise the step of selecting hyperparameters for the ML model. It will be appreciated that the selection and tuning of hyperparameters for a given ML task is established practice in a wide variety of ML applications. Selection of hyperparameters may for example comprise using default values initially, and then using a grid search or other method to identify optimal hyperparameter values for a given task.

Figure 2B:
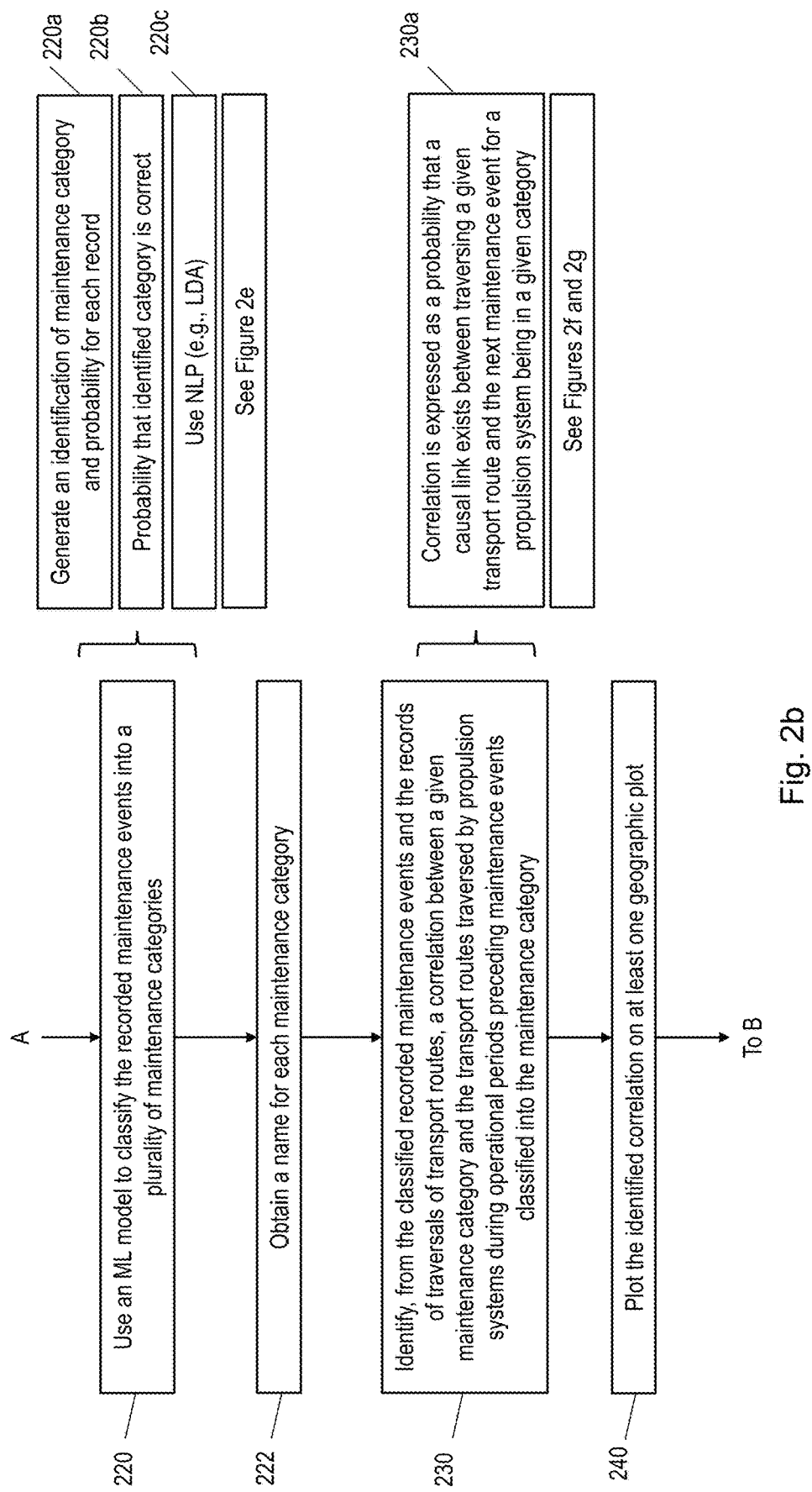

Referring now to FIG. 2b, in step 220, the method 200 comprises using an ML model to classify the recorded maintenance events into a plurality of maintenance categories. As illustrated at 220a, this may comprise using the ML model to generate, for each recorded maintenance event, an identification of the maintenance category into which the maintenance event is classified, and a probability associated with the classification. The ML model in such examples may thus comprise a probabilistic ML model. The probability associated with the classification may comprise a probability that the identified maintenance category is the correct maintenance category for the recorded maintenance event, as shown at 220b. In the present context, "correct" may be understood as referring to the most appropriate category, that is the category to which the recorded event, as represented by its record, is most closely related.

In some examples, as illustrated at 220c, the ML model may comprise a Natural Language Processing (NLP) model, which may for example be a Latent Dirichlet Allocation (LDA).

Figure 2C:
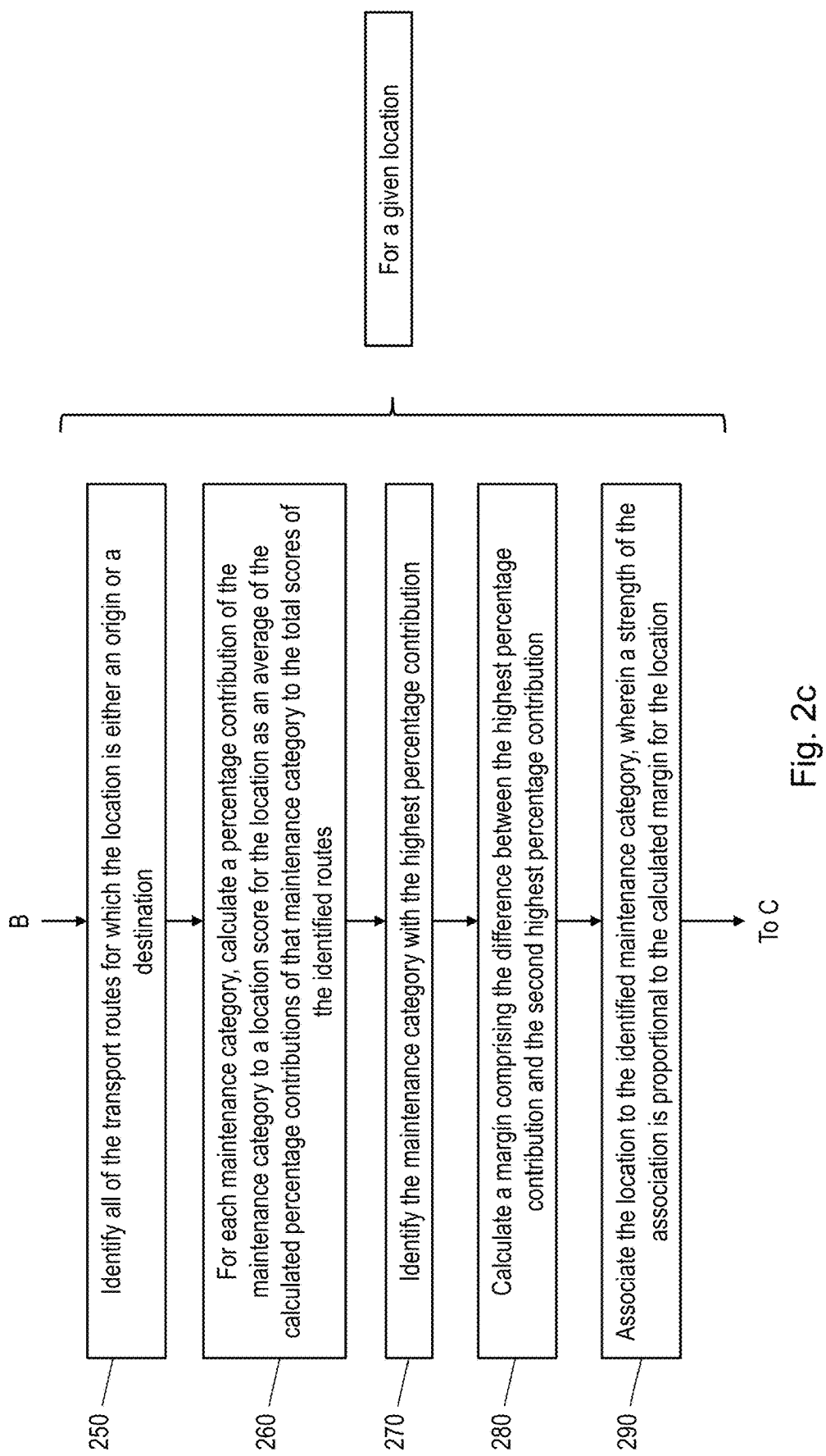
Figure 2D:
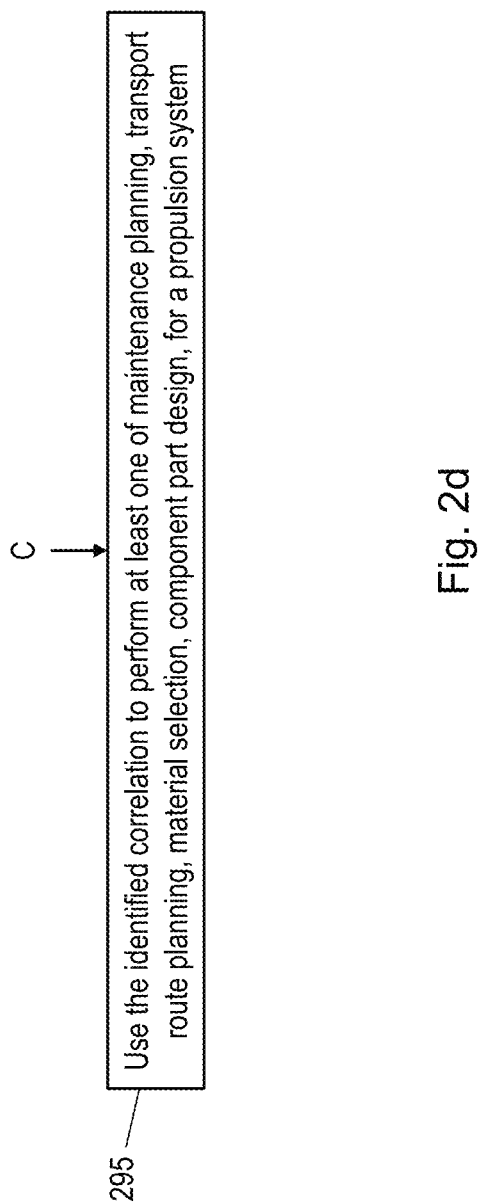
Figure 2E:
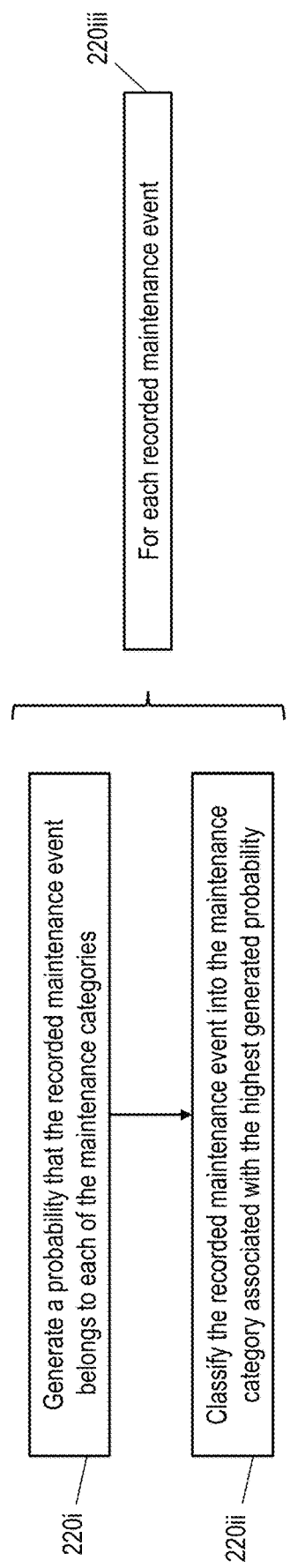

FIG. 2e illustrates sub-steps that may be carried out in order to perform the step 220 of using an ML model to classify the records of maintenance events into a plurality of maintenance categories. Referring to FIG. 2e, a management node performing the method 200 may, for each recorded maintenance event as illustrated at 220iii, generate a probability that the recorded maintenance event belongs to each of the maintenance categories in step 220i, and classify the recorded maintenance event into the maintenance category associated with the highest generated probability in step

220ii. It will be appreciated that the highest generated probability is the probability associated with the classification, as discussed above. It will also be appreciated that the generation of probabilities and classification are performed by the ML model, and so carrying out these steps may comprise inputting to the ML model the (pre-processed) obtained records, wherein the ML model is operable to generate the probabilities and output the classification result and its associated probability. In some examples, the ML model may output all of the generated probabilities.

Referring again to FIG. 2*b*, the method 200 then comprises obtaining a name for each maintenance category in step 222. In some examples, the category names may be generated manually, and input to the management node or other entity performing the method. For example, a human operator may review classified maintenance records in each category, and select a suitable name for each category.

In step 230, the method 200 comprises identifying, from the classified recorded maintenance events and the records of traversals of transport routes, a correlation between a given maintenance category and the transport routes traversed by propulsion systems during operational periods preceding maintenance events classified into the maintenance category. As illustrated at 230*a*, the correlation may be expressed as a probability that a causal link exists between traversing a given transport route and the next maintenance event for a propulsion system being in a given maintenance category.

Figure 2F:
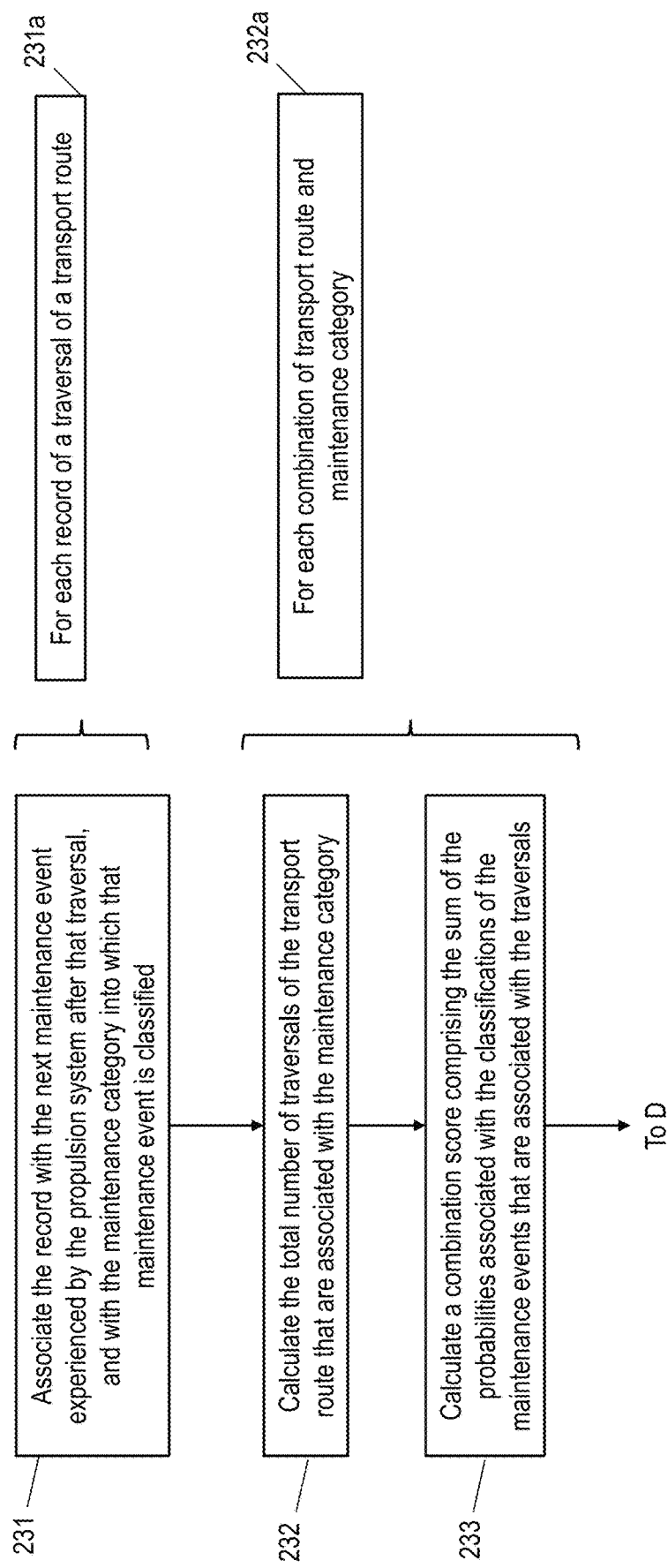
Figure 2G:
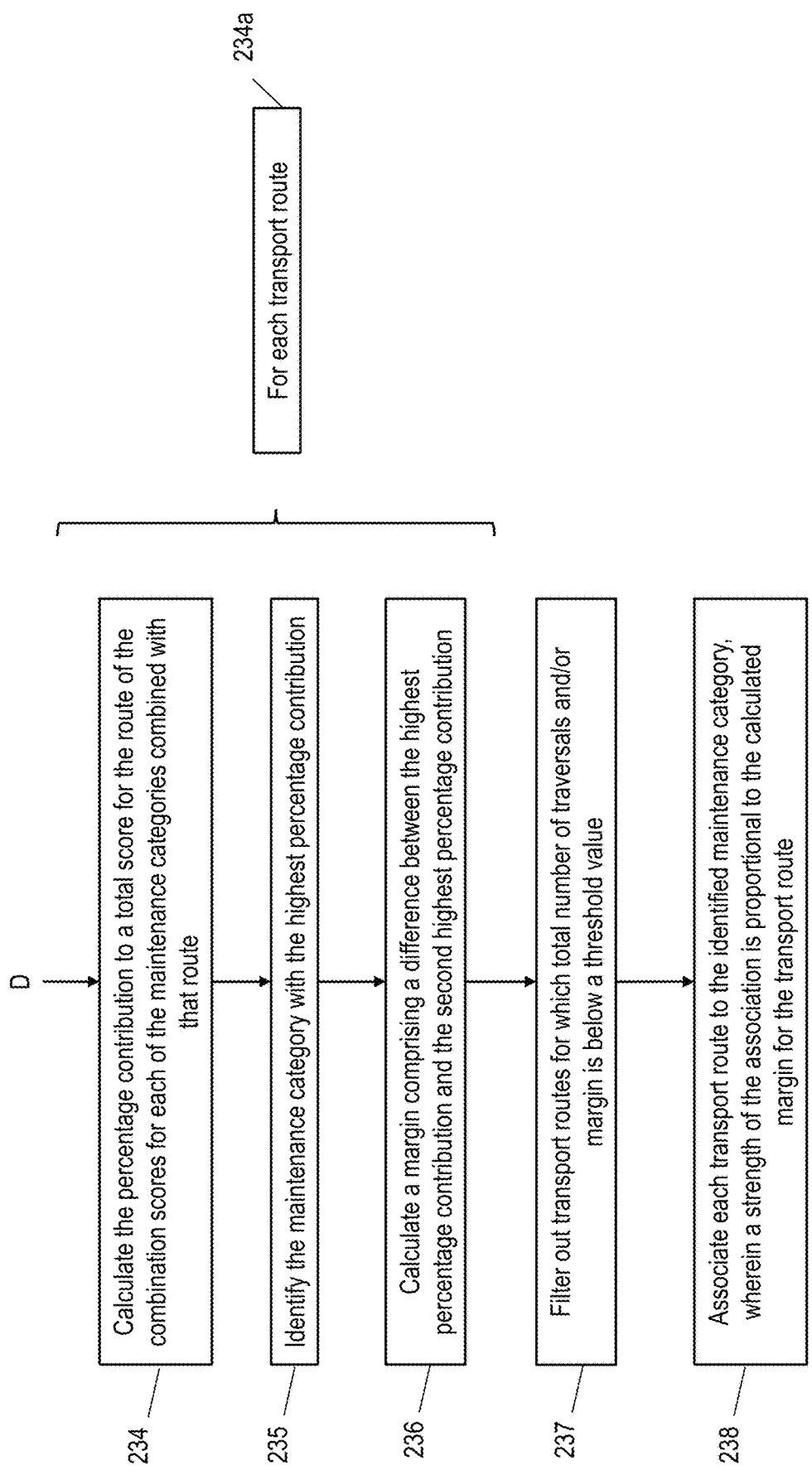

FIGS. 2*f* and 2*g* illustrate sub-steps that may be carried out in order to perform the step 230 of identifying, from the classified recorded maintenance events and the records of traversals of transport routes, a correlation between a given maintenance category and the transport routes traversed by propulsion systems during operational periods preceding maintenance events classified into the maintenance category. Referring initially to FIG. 2*f*, a management node performing the method 200 may first, for each record of a traversal of a transport route as illustrated at 231*a*, associate the record with the next maintenance event experienced by the propulsion system after that traversal, and with the maintenance category into which that maintenance event is classified in step 231. The management node may then perform steps 232 and 233 for each combination of transport route and maintenance category, as illustrated at 232*a*. In step 232, the management node may calculate the total number of traversals of the transport route that are associated with the maintenance category, before calculating a combination score comprising the sum of the probabilities associated with the classifications of the maintenance events that are associated with the traversals in step 233.

Referring to FIG. 2*g*, the management node may then perform steps 234, 235 and 236 for each transport route, as illustrated at 234*a*. In step 234, the management node may calculate the percentage contribution to a total score for the route of the combination scores for each of the maintenance categories combined with that route. The total score for the route may for example comprise the sum of the combination scores of all combinations including that particular route, and the percentage contribution may for example be calculated by determining the percentage of the total score that is represented by each combination score included in the sum. The management node may then identify the maintenance category with the highest percentage contribution in step 235, and calculate a margin comprising a difference between the highest percentage contribution and the second highest percentage contribution. This margin may for example serve to distinguish transport routes which are strongly associated with a single maintenance category (those having a large margin between the highest percentage contribution and the second highest percentage contribution), and transport routes which are more evenly associated with two or more maintenance categories (those having a small margin between the highest percentage contribution and the second highest percentage contribution).

In step 237, the management node may filter out transport routes for which at least one of the total number of traversals of the route and/or the calculated margin is below a respective threshold value. Filtering transport routes on the basis of a number of traversals may ensure that routes which are very rarely traversed are not correlated with a maintenance category, as the number of traversals is not sufficient to generate a statistically meaningful correlation. Filtering transport routes on the basis of calculated margin avoids identifying a specific correlation in the event that a transport route is in fact relatively evenly associated with two or more maintenance categories.

In step 238, the management node may then associate each remaining transport route to the identified maintenance category, wherein a strength of the association is proportional to the calculated margin for the transport route. A high margin, indicating a large difference between the percentage contribution of the associated maintenance category and the next most significant category contribution, consequently translates to a strong association between the associated maintenance category and the transport route.

Referring again to FIG. 2*b*, the method 200 may then comprise, in step 240, plotting the identified correlation on at least one geographic plot, which may be a geospatial plot.

Referring now to FIG. 2*c*, the method 200 may further comprise identifying correlations between specific locations and individual maintenance categories, as illustrated in steps 250 to 290. In order to identify such correlations, the method 200 comprises performing steps 250 to 290 for a given location, which may be an origin location or a destination location of any one or more of the transport routes.

In step 250, the method 200 comprises identifying all of the transport routes for which the given location is either an origin or a destination. The method then comprises, in step 260, for each maintenance category, calculating a percentage contribution of the maintenance category to a location score for the location as an average of the calculated percentage contributions of that maintenance category to the total scores of the identified routes. It will be appreciated that this procedure is based on the calculation of percentage contributions for a total score of a transport route, as discussed above, and consequently encompasses the advantages of considering percentage contributions, avoiding scaling issues associated with highly travelled transport routes. In steps 270 and 280, the method 200 comprises identifying the maintenance category with the highest percentage contribution, and calculating a margin comprising the difference between the highest percentage contribution and the second highest percentage contribution. In step 290, the method 200 comprises associating the location to the identified maintenance category, wherein a strength of the association is proportional to the calculated margin for the location. Similar filtering steps to those discussed above may also be carried out, for example to filter on a number of times a particular location was visited by a propulsion system, and/or on the size of the calculated margin.

Referring now to FIG. 2*d*, in step 295, the method 200 may further comprise using the identified correlation to perform at least one of maintenance planning, transport route planning, material selection, and/or component part design for a propulsion system. The propulsion system for which maintenance or route planning is performed may be one of the propulsion systems for which records were obtained, or may be of the same make, model, type, etc. as at least some of the propulsion systems for which records were obtained. It will be appreciated that there is a wide range of options for precisely how the identified correlation might be used to perform maintenance or route planning. These options include, for example, pre ordering parts that are likely to need replacing based on the correlation and a route schedule for a particular propulsion system, sharing the load for routes associated with increased part failure between different propulsion systems, etc. In addition, material selection and/or component part design may be tailored to address the frequently occurring maintenance issues on well-travelled transport routes. Similar maintenance and/or transport planning may be performed using an identified correlation between location and maintenance category, as discussed above.

As discussed above, the methods 100 and 200 may be performed by a management node, and the present disclosure provides a management node that is adapted to perform any or all of the steps of the above discussed methods. The management node may comprise a physical node such as a computing device, server etc., or may comprise a virtual node. A virtual node may comprise any logical entity, such as a Virtualized Network Function (VNF) which may itself be running in a cloud, edge cloud or fog deployment. The management node may be operable to be instantiated in a cloud based deployment.

Figure 3:
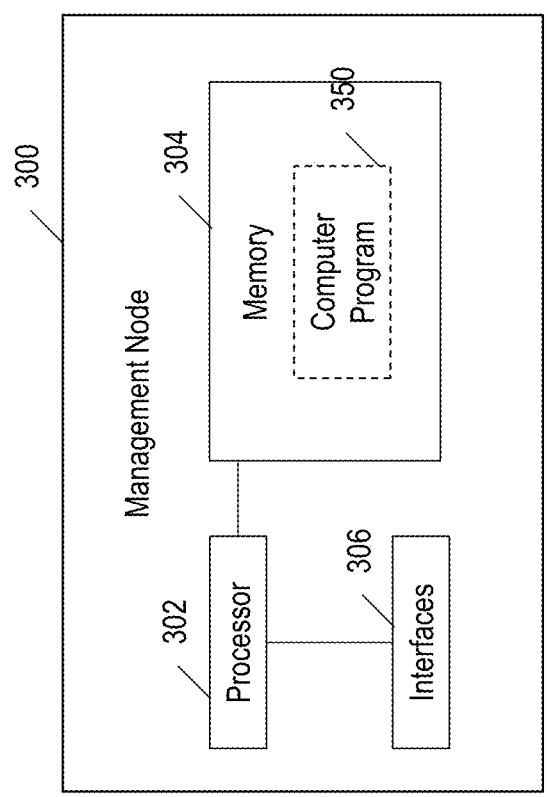
FIG. 3 is a block diagram illustrating functional modules in an example management node.

FIG. 3 is a block diagram illustrating an example management node 300 which may implement the method 100 and/or 200, as illustrated in FIGS. 1 and 2a to 2g, according to examples of the present disclosure, for example on receipt of suitable instructions from a computer program 350. Referring to FIG. 3 the management node 300 comprises a processor or processing circuitry 302, and may comprise a memory 304 and interfaces 306. The processing circuitry 302 is operable to perform some or all of the steps of the method 100 and/or 200 as discussed above with reference to FIGS. 1 and 2a to 3g. The memory 304 may contain instructions executable by the processing circuitry 302 such that the management node 300 is operable to perform some or all of the steps of the method 100 and/or 200, as illustrated in FIGS. 1 and 2a to 2g. The instructions may also include instructions for executing one or more communications protocols. The instructions may be stored in the form of the computer program 350. In some examples, the processor or processing circuitry 302 may include one or more microprocessors or microcontrollers, as well as other digital hardware, which may include digital signal processors (DSPs), special-purpose digital logic, etc. The processor or processing circuitry 302 may be implemented by any type of integrated circuit, such as an Application Specific Integrated Circuit (ASIC), Field Programmable Gate Array (FPGA) etc. The memory 304 may include one or several types of memory suitable for the processor, such as read-only memory (ROM), random-access memory, cache memory, flash memory devices, optical storage devices, solid state disk, hard disk drive, etc.

FIGS. 1 to 2g discussed above provide an overview of methods which may be performed according to different examples of the present disclosure. These methods may be performed by a management node, as illustrated in FIG. 3. The methods enable the identification of a correlation between particular transport routes and particular categories of maintenance for a propulsion system traversing the transport routes. There now follows a detailed discussion of how different process steps illustrated in FIGS. 1 to 2g and discussed above may be implemented, with reference to an example investigation into possible links between aircraft engine maintenance activity and routes flown and/or airports visited by these engines. The functionality and implementation detail described below is presented with reference to a management node as illustrated in FIG. 3 performing examples of the methods 100 and/or 200 substantially as described above.

Data Input (Steps 110, 210 of Methods 100, 200)

Figure 4:
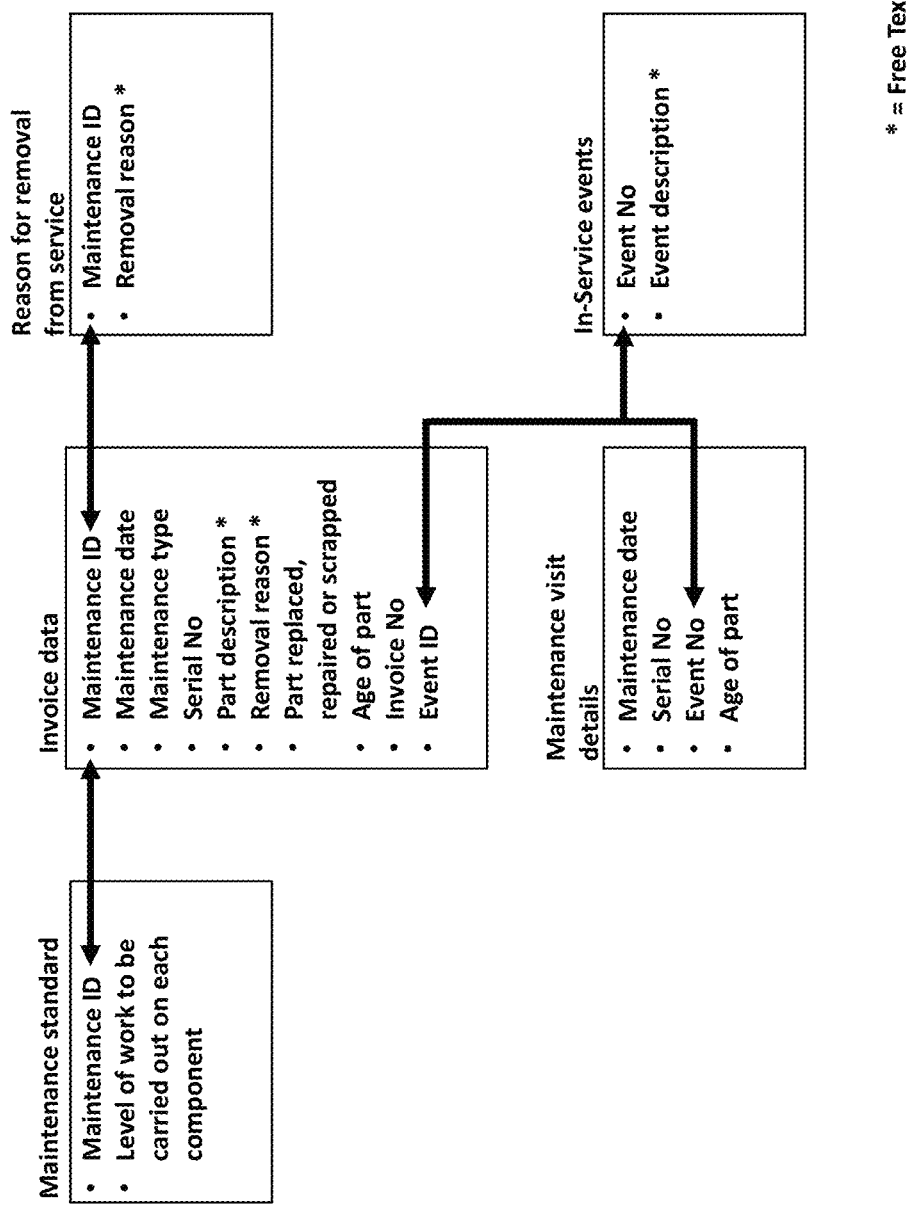
FIG. 4 illustrates a structure of maintenance data.

Maintenance data used in the example investigation reported herein was extracted from a suitable database. An overview of the structure of the downloaded data is illustrated in FIG. 4, which shows the size of each table and the parameters used to link the tables together, as well as the names of some of the columns in the tables.

It was determined that much of the information useful for understanding why an engine was sent for maintenance, as opposed to information about what was repaired, was located in the free text fields. After some initial experimentation, it was decided to use the 'Removal Reason' column from 'Invoice Data' and the 'Event Description' column from 'In-Service Events', as the other free-text columns were determined to include significant amounts of information that did not add meaning. For a given maintenance visit, the text from the two columns was concatenated into one new column (steps 212b and 212i of method 200).

Pre-Processing of Input Data (Step 212 of Method 200)

Topic extraction from free text is a tool used in Data Science to categorise documents according to their content. In the present investigation, the descriptive text for each maintenance record was considered as a 'document' and the desired outcome was a set of topics (referred to as categories) with each maintenance record associated with the most likely category, that is the category with which it is most likely (highest probability) that the document is most closely related.

The method used in the investigation presented herein is Latent Dirichlet Allocation (LDA), which is a generative statistical model that allows sets of observations to be explained by unobserved groups that explain why some parts of the data are similar. In the present investigation, the LDA algorithm was implemented using the Python Gensim library with the Mallet extension2. Gensim is an open-source library for unsupervised topic modelling and natural language processing, using statistical machine learning.

Before the text was processed by the LDA algorithm, it was pre-processed to prevent different forms of the same word being treated as different words, and to remove words with no contextual meaning. This pre-processing was carried out using the Python Re (Regular Expressions) and NLTK (Natural Language Tool Kit) libraries as follows:

Convert to lower-case ('Turbine' to 'turbine').

Remove non-alpha-numeric characters ('corroded!' to 'corroded').

Remove words containing numbers—This was a subjective choice, and it is envisaged that in some implementations, better performance will be achieved by including words with numbers, or by removing just the numbers. In the present investigation, a pilot study was used to determine that removing all words with numbers in them gave results with a higher probability.

Remove stop-words ('at', 'this', 'the' etc.).

Lemmatize the text ('studies' to 'study, 'studying' to 'study'). A simpler approach would be to use Stemming, however Stemming results in strings that are not actual words, which may give results that are more difficult to interpret when compared to Lemmatization, which uses models of grammar to find the correct word.

Find bi-grams and tri-grams ('fan_case', 'bird_strike_damage'). These are found automatically by the library and are groups of words that often appear together.

Obtain Number of Categories (Step 214 of Method 200)

As with most clustering techniques, LDA requires a selection to be made of the number of topics to use. The algorithm finds the topics themselves, but the number of topics is set according to the application. It may be that the optimal number of topics is not initially known, so the LDA algorithm may be run multiple times with different numbers of topics to find the most appropriate number. In the present context, it is desirable to have enough categories to have distinct groups of maintenance types, but not so many that the groups overlap. After some experimentation it was found that five categories were appropriate.

Select Hyper-Parameters

In the present case, default Hyper-parameter values were used initially, with a grid search method used to find the best values.

Classify into Maintenance Categories (Steps 120, 220 of Methods 100, 200)

Figure 5:
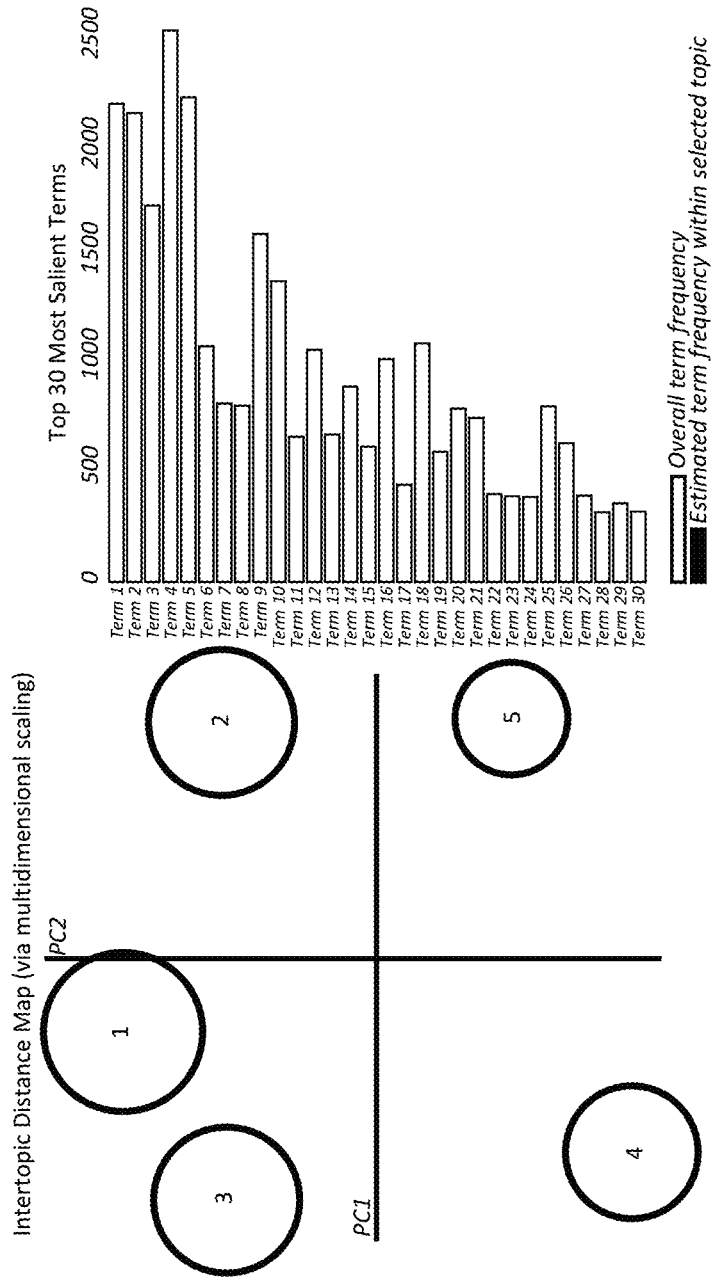
FIGS. 5 and 6 illustrate classification results from an example implementation of the methods of the present disclosure.
Figure 6:
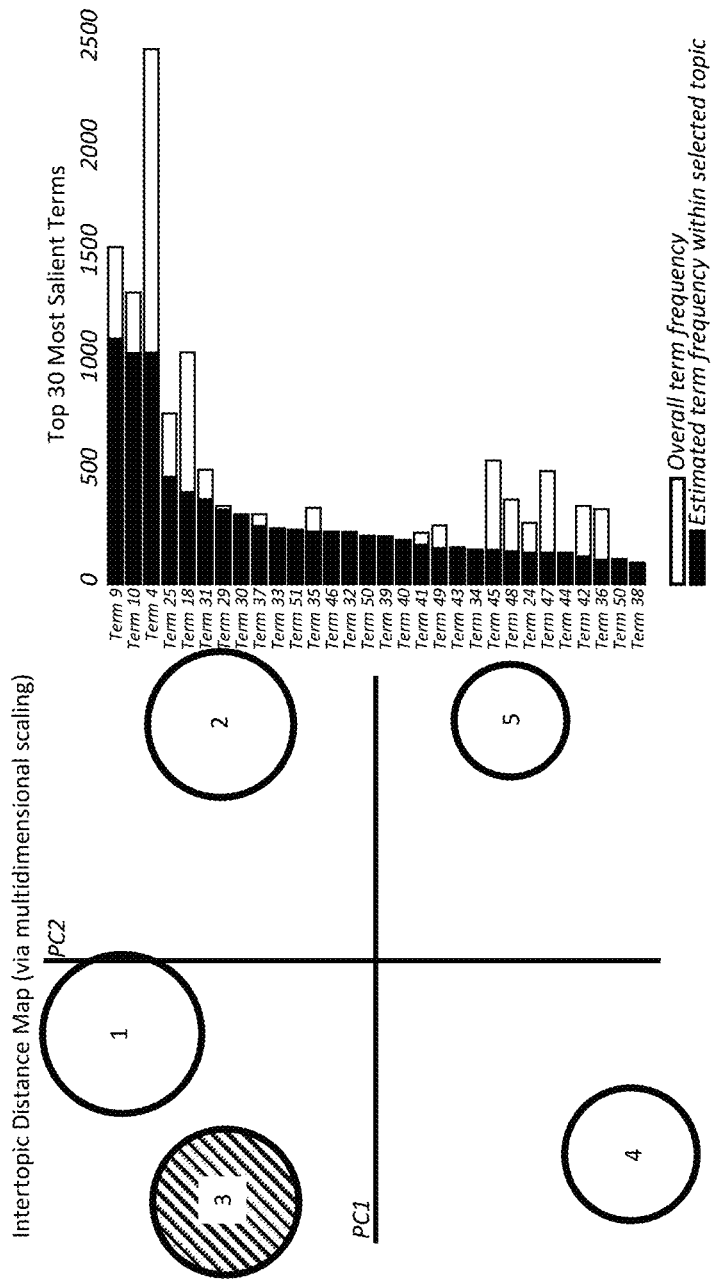

The output from the LDA algorithm was displayed in an interactive html page generated by the code using the LDAvis tool; example representations of outputs from this tool are illustrated in FIGS. 5 and 6.

The actual axes of the LDAvis plot do not have any meaning in a physical sense but the distance between circles (categories) is an indication of the difference between the individual categories, and the size of the circle is an indication of the number of words that belong to that category. A good result from the LDA algorithm will show circles of a similar size that do not overlap.

The results from the maintenance report analysis are shown in FIG. 5, from which it can be seen that the selection of Hyper-Parameters has produced five non-overlapping categories of similar size. The list of terms shows the frequency of occurrence of the top 30 most salient terms across the whole set of words appearing in the classified documents. It will be appreciated that these are not necessarily the most common terms.

As discussed above, the LDA algorithm does not give the categories names, these are created manually by examining the terms belonging to each category, as discussed in more detail below.

FIG. 6 shows the output for a single category, with the terms that make up this category illustrated. The leftmost (shaded black) part of the horizontal bar for each term shows the proportion of the uses of that term in the selected category. The terms at the top of the list show what the category represents. For example, for the illustrated category 3, the top terms were either related to compressor components (hpc, ipc, fan etc.) or to damage (damage, crack, loss etc.) and so this category was considered to represent "Compressor Damage".

It will be appreciated that for the top term (term 9), the shaded part of the horizontal bar only covers approximately 74% of the bar, meaning that this term is also used for another category or categories. This may well be the case for terms that relate for example to damage, as such damage may be seen in relation to more than one component. For the next term (term 10), the proportion is also approximately 74%, meaning that 26% of uses of this term appear elsewhere. If term 10 relates to a specific component, such as a compressor, then it may be expected that the remaining 26% of occurrences of this term may be found in a category that comprises maintenance visits relating to end of expected operational life of a part, such as "Life expired parts". This distinction between appearances of a component specific term in different contexts suggests that the methods presented herein were able to detect the difference between a maintenance visit caused by a failure of a specific component type, and a maintenance visit caused by a component of that type having reached the end of its working life. It is proposed that both the use of an NLP technique and the size of the dataset considered contributed to this capacity for contextual differentiation between uses of the same term.

For category 1, the top terms were similar to those in category 3 "Compressor damage", but for turbine components (hpt, hptb, lpt, ipt etc.) and damage (crack, distress, damage etc.). This category was therefore designated as "Turbine damage". It will be appreciated that on the plot, the Compressor damage category is close to the Turbine damage category, suggesting that the two categories are similar, but not overlapping, suggesting that they are distinct.

Category 4 is separated from the other categories, suggesting that it is unrelated to them. A study of the terms associated with this category shows that the category relates to oil leakage/high-pressure (oil, high, consumption, leak) or to vibration (vibration). Although oil and vibration issues initially appear to be independent, there is also the possibility that they are sometimes related, as loss of oil in a bearing could cause it to vibrate. This is further supported by the inclusion of the word "bear" (presumably meaning bearing) appearing in the list.

Category 5 has a strong association with the words "tgt" and "margin", as well as with the bigram "tgt_margin". These terms are wholly associated with this topic. Other words at the top of the list include "policy", "plan", "overhaul" and "refurbishment" suggesting that these may be pre-planned maintenance visits. The category was named "TGT margin".

In category 2, the top five terms all refer to life limited parts or time expiry (llp, expire, time, life, timex) and thus it was concluded that this category relates to maintenance visits relating to planned end of part life maintenance. The category was named "Life expired parts/Planned shop visit". Although this category shared some of the meaning of the TGT Margin topic, their separation on the plots suggests that they are in fact distinct categories.

Identify a Correlation Between Transport Routes and Maintenance Categories (Steps 130, 230 of Methods 100, 200)

This step was implemented in several sub steps, as discussed below.

Linking Categories to Maintenance Records (Step 231 of Method 200)

For each row in the input data, where one row of data represents one maintenance visit and so one maintenance record, the LDA algorithm will give the probability of that row belonging to each of the five maintenance categories. Some example values are shown in FIG. 7, in which the information in the final two columns is taken from the LDA results. The two columns show the most probable category and the probability of that category. It will be appreciated that while the probability is generally high (above 80%), there are cases where the probability is lower. This could be owing to two categories having similar probabilities, and there not being a clear winning maintenance category for that maintenance visit. These probabilities are taken into account when carrying out subsequent analysis to ensure that results with a lower probability have a lesser effect on the final correlation.

Defining a Relationship Between Maintenance Categories and Routes Flown (Steps 232 to 238 of Method 200)

In order to link the flight routes flown with maintenance types (or categories), two sources of data were combined: the EHM flight route data for each engine, including each report of a traversal of a flight route, and the maintenance data for each engine, including the maintenance topic into which each report for the engine was classified and their probabilities.

For the purpose of the present investigation, routes were considered to be non-directional (for example, EGLL to VHHH was considered to be the same route as VHHH to EGLL). This is a simplification as in reality the two routes will fly on different paths, however the exact flight routes were not available from the EHM data, and so were plotted on maps as discussed below as Great Circles between the two airports (which would result in the same Great Circle for either direction).

The flight data used for correlation identification included, after cleaning and removing flights that had the same departure and arrival airports, a total number of flights for each engine type which ranged from several hundred thousand flights to several million flights. The maintenance data included, after removing maintenance visits with no text remaining after pre-processing, and which could not therefore be allocated a maintenance topic, a total number of maintenance visits for each category that ranged between roughly 1000 and 3000 visits per category.

Figure 8:
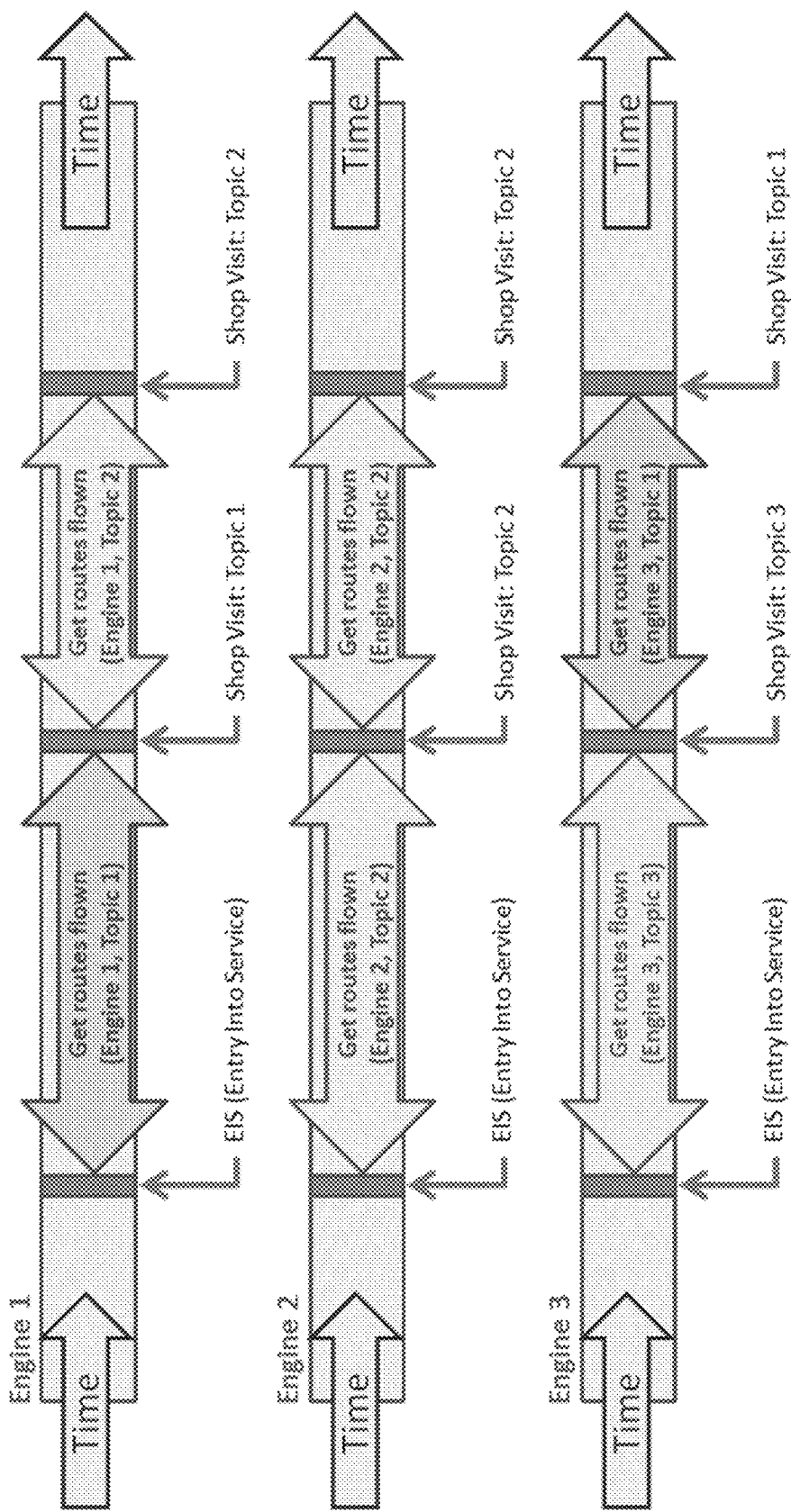
FIGS. 8 and 9 illustrate combination of flight and maintenance data as performed in the example implementation.
Figure 9:
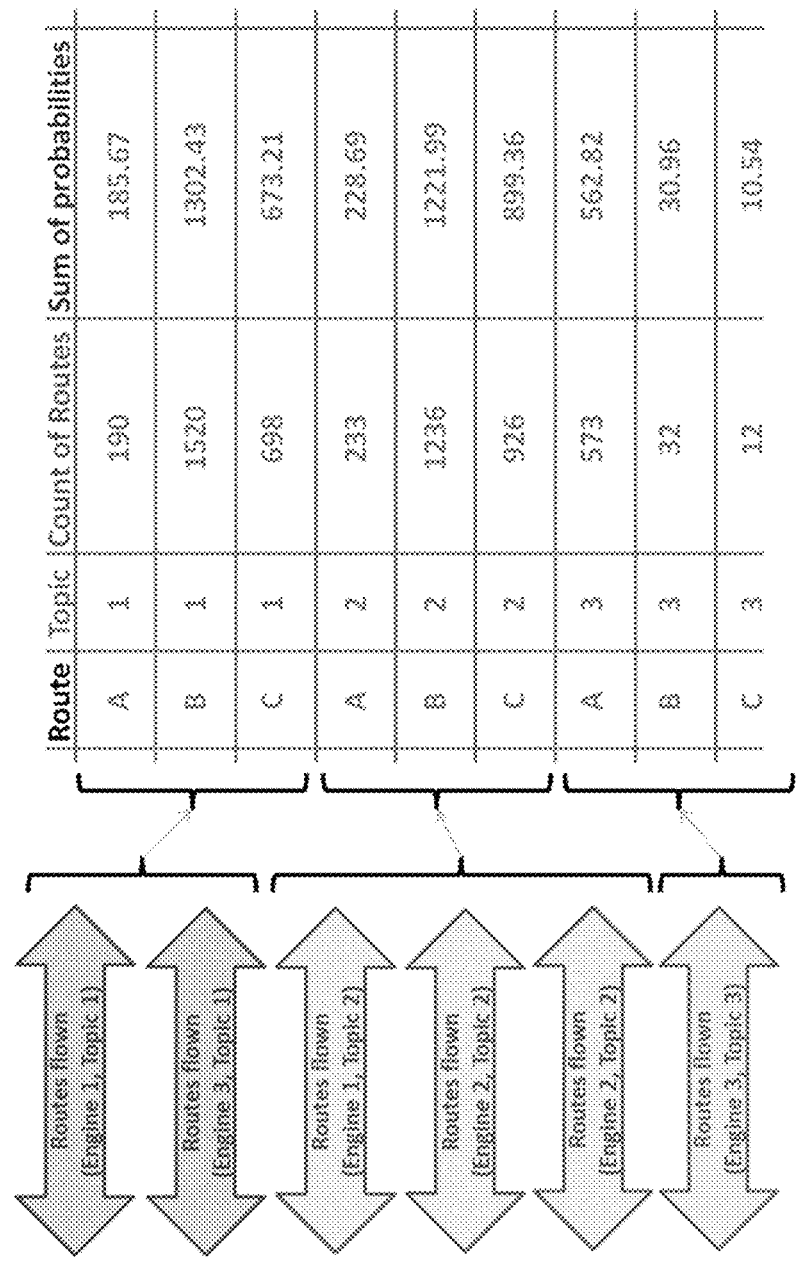

The data was combined such that the total number of flights were calculated for each combination of route and that flight's next maintenance visit category (step 232 of method 200). This resulted in a value for each unique combination of route and maintenance topic. For each unique combination of route and maintenance topic, the sum of probabilities was calculated (step 233 of method 200). Any potential scaling issues caused by routes with the most flights dominating the data was addressed by the calculation of percentage contributions in a later step, as discussed below. This combination and calculation is illustrated graphically in FIGS. 8 and 9 using simplistic values for illustration. A subset of the results obtained with the actual data is shown in FIG.

In order to understand which maintenance categories dominate for given routes, the table shown in FIG. 10 was updated as shown in FIG. 11. The additional columns in FIG. 11 show the contribution of each maintenance category to the total for a given route (step 234 of method 200), along with an indication as to which category has the maximum contribution (step 235 of method 200).

Figure 12:
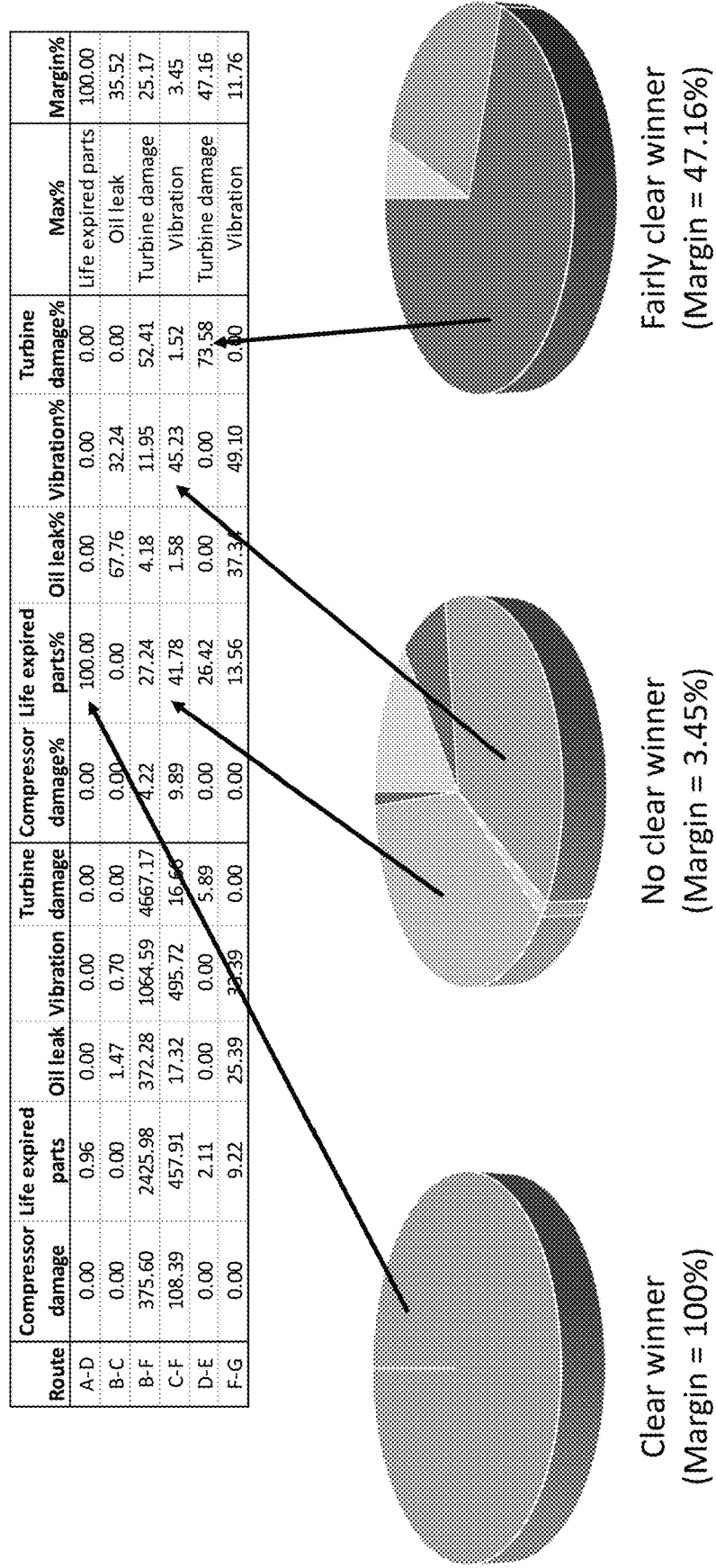
FIG. 12 illustrates the calculation of Margin.

It can be seen that for some routes, there is a category that clearly contributes the most to the maintenance burden of that engine over that route (Route D-E in FIG. 11 for example), and it can also be seen that for some routes, there is more than one contender, as there is no single maintenance category that dominates (Route C-F in FIG. 11 for example). Values of 100% should be treated with caution as they may be for routes with a very low number of flights. For example, it will be noted that in FIG. 12, there is one row with a contribution value of 100%, but that route had only a very low number of flights. Such routes may be filtered out in a later step as discussed below.

The calculated Margin for each route is a metric that illustrates to what extent the category with the maximum contribution dominates. The margin is a measure of how much greater the percentage contribution of the maximum contribution category is than the next highest contribution. The value for Margin can be seen in FIG. 12 (step 236 of method 200).

A low value of Margin, indicating multiple candidates for the category with the greatest contribution to maintenance burden for a route, or a very low number of flights on a route, are both potential sources of noise in the data used for identifying a correlation. Removing this noise can assist with highlighting those routes which have a genuine strong correlation with a particular maintenance category. In the present investigation, two thresholds were created, and after some experimentation default values were set as follows (step 237 of method 200):

Low value of 'Margin'–Default threshold=20%
Low number of flights–Default threshold=10 flights The remaining routes were considered to be associated (correlated) with their maximum contribution maintenance categories, with a strength of the association being proportional to the calculated margin for the transport route (step 238 of method 200)

By combining all of the newly generated data and applying the thresholds shown above, the transport routes were plotted by engine type and maintenance category (step 240 of method 200), with the intensity of the line representing a transport route being proportional to the value of Margin. For the plots, each route was shown as a great circle between the two airports as the exact flight route was not known. It was envisaged that a plot of Life Expired Parts should act as a control case (and show most, if not all, of the routes flown), as it is expected that maintenance corresponding to this category is relatively independent of the routes flown. Considering a TGT plot, was observed that flight routes visiting certain parts of the globe did not appear to result in TGT maintenance visits. Most of the flight routes highlighted as resulting in a TGT shop visit were in the vicinity of the 'Ring of Fire', a region in which many volcanic eruptions and earthquakes occur, and an area known to be high in sulphur and salt. The correlation between TGT shop visit probability and routes through this region suggests that a connection exists between the maintenance type and the environment through which an engine flies.

Defining a Relationship Between Maintenance Categories and Airports (Steps 250 to 290 of Method 200)

It may in some circumstances be useful to be able to link airports to maintenance category, although it will be appreciated that when linking airports to maintenance it is not known where on a route damage is experienced: it could be at the departure airport, en-route, at the arrival airport, or a combination of all of these. A greater degree of uncertainty will therefore exist in correlations between airport and maintenance category, but identifying such correlations may still be of use for maintenance planning, route planning, engine design and management.

In the example investigation, a statistical approach was taken in which the mean score for an airport across all flight-routes visiting that airport was calculated (steps 250 and 260 of method 200). Using the mean value prevented busy airports with many routes from dominating. The route data was split into two new columns and then repeated for Airport 1 and Airport 2, giving a new table (an extract of which is shown in FIG. 13) that is twice as long as the original table, but with every airport included multiple times.

Figure 15:
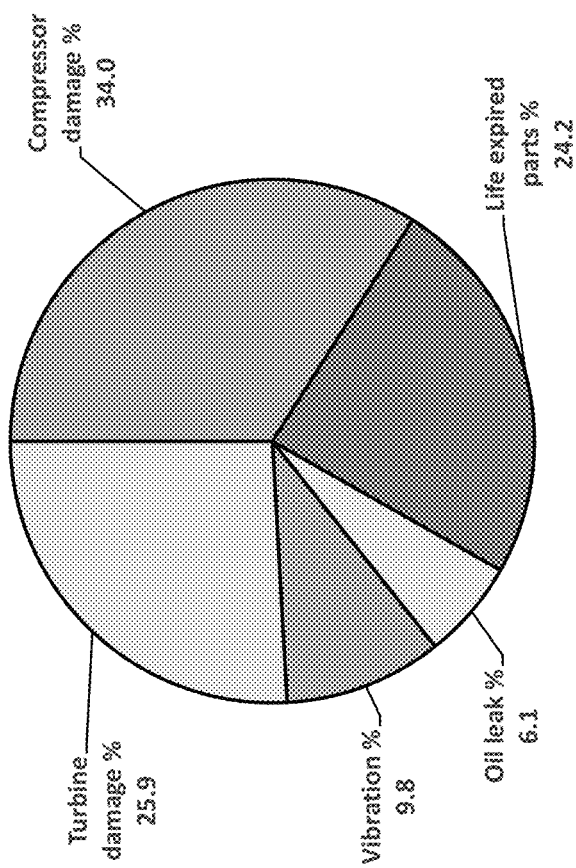
FIG. 15 shows example maintenance category data for an example airport.

The data is then grouped (and aggregated by mean) by airport to give a single set of data for each airport, as shown in FIG. 14. The mix of maintenance topics can now be seen for any given airport, as shown in FIG. 14. An example for one airport is given in FIG. 15. In this example the Compressor damage margin is 8.1% (34%-25.9%) meaning there is no major contributor in this case. A calculated margin (step 280 of method 200) was again used to filter airports for which no category dominated (as in the example of FIG. 15), and airports were then associated with the maintenance category having the highest contribution (step 290 of method 200).

The airport correlation data was also plotted on a map, with a colour of each circle, representing an airport, being indicative of the strength of the link between the airport and the particular maintenance category being represented. The data was filtered using the same thresholds as for the route plots (Min. flights per route=10 and min. Margin=20%), therefore a value of 100% on the plot did not indicate that every flight visiting that airport resulted in that particular maintenance type, but that after applying the threshold, there is a strong confidence that there is a link between airport and maintenance type (after accepting the caveats mentioned earlier).

Examples of the present disclosure thus use ML models in a process that identifies a correlation between a given maintenance category and transport routes traversed by propulsion systems, such as an engine. The correlation may in some examples be expressed as a probability that a causal link exists between traversing a given transport route and the next maintenance event for a propulsion system being in a given maintenance category. This correlation may be used to facilitate maintenance management of a propulsion system, for example through maintenance planning according to likely maintenance categories for systems regularly traversing certain routes, route planning to share the load of certain routes between systems, system component part design and/or material selection.

In some examples of the present disclosure, NLP algorithms, such as LDA, are used to classify maintenance reports into maintenance categories, based on the contents of free text fields in the reports. Using NLP, and LDA in particular, may assist with extracting meaning and context from the free text descriptions, making it possible to understand why a repair was carried out rather than just what was repaired or replaced.

The correlations identified between transport routes and propulsion system maintenance categories may be used by multiple actors and in various different ways. In some examples, the correlation may be used for direct maintenance planning, for example to prepare equipment and maintenance location availability, ensure availability of spare parts, etc. Different levels of maintenance service provision may also be envisaged for operators of propulsion systems that frequently travel routes that are correlated with significant maintenance load. In further examples, operators may manage their available propulsion systems in such a way as to minimize exposure to transport routes that are correlated with significant maintenance requirements, for example to switch systems between relatively harsh and benign transport routes, sharing the load of the harsher routes amongst the available propulsion systems, and optionally also the vehicles in which they are installed.

In addition to the measures discussed above, there may also be opportunities to optimize flight route planning to minimize harsh environment damage. For example, take-off slots may be changed to less harsh times of day, or take-off climb profiles and even flight routes may be modified slightly to avoid particularly harsh airspace.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims or numbered embodiments. The word "comprising" does not exclude the presence of elements or steps other than those listed in a claim or embodiment, "a" or "an" does not exclude a plurality, and a single processor or other unit may fulfil the functions of several units recited in the claims or numbered embodiments. Any reference signs in the claims or numbered embodiments shall not be construed so as to limit their scope.

I claim:

1. A computer implemented method for facilitating maintenance management of a propulsion system for a vehicle, the method comprising:
    obtaining, for each of a plurality of propulsion systems, records of maintenance events experienced by the propulsion system, and records of traversals of transport routes by the propulsion system during a period of propulsion system operation, wherein a maintenance event comprises temporary removal of the propulsion system from service, and during which one or more maintenance activities are carried out on the propulsion system;
    using a Machine Learning, ML, model to classify the recorded maintenance events into a plurality of maintenance categories;
    identifying, from the classified recorded maintenance events and the records of traversals of transport routes, a correlation between a given maintenance category and the transport routes traversed by propulsion systems during operational periods preceding maintenance events classified into the maintenance category, wherein the correlation is expressed as a probability that a causal link exists between traversing a given transport route and the next maintenance event for a propulsion system being in a given maintenance category; and
    performing, by one or more processors and based on the identified correlation, at least one of maintenance planning, and/or transport route planning for the propulsion system.

2. The method as claimed in claim 1, wherein using an ML model to classify the records of maintenance events into a plurality of maintenance categories comprises:
    using the ML model to generate, for each recorded maintenance event, an identification of the maintenance category into which the maintenance event is classified, and a probability associated with the classification.

3. The method as claimed in claim 2, wherein the probability associated with the classification comprises a probability that the identified maintenance category is the correct maintenance category for the recorded maintenance event.

4. The method as claimed in claim 1, further comprising:
    pre-processing the obtained records of maintenance events by, for each record of a maintenance event:

filtering the record to retain only the content of at least one free text field of the record; and
concatenating free text from the retained content to form a document.

5. The method as claimed in claim 1, further comprising: obtaining a number of maintenance categories into which the records of maintenance events are to be classified.

6. The method as claimed in claim 5, wherein obtaining a number of maintenance categories into which the records of maintenance events are to be classified comprises using an iterative process to identify a number that results in no overlap between maintenance categories following classification of the obtained maintenance records by the ML model.

7. The method as claimed in claim 1, wherein using an ML model to classify the records of maintenance events into a plurality of maintenance categories comprises using the ML model to perform, for each recorded maintenance event:
generation of a probability that the recorded maintenance event belongs to each of the maintenance categories; and
classification of the recorded maintenance event into the maintenance category associated with the highest generated probability.

8. The method as claimed in claim 1, further comprising obtaining a name for each maintenance category.

9. The method as claimed in claim 1, wherein the ML model comprises a Natural Language Processing, NLP, model.

10. The method as claimed in claim 1, wherein the ML model comprises Latent Dirichlet Allocation, LDA.

11. The method as claimed in claim 2, wherein identifying, from the classified recorded maintenance events and the records of traversals of transport routes, a correlation between a given maintenance category and the transport routes traversed by propulsion systems during operational periods preceding maintenance events classified into the maintenance category comprises:
for each record of a traversal of a transport route, associating the record with the next maintenance event experienced by the propulsion system after that traversal, and with the maintenance category into which that maintenance event is classified; and
for each combination of transport route and maintenance category:
calculating the total number of traversals of the transport route that are associated with the maintenance category; and
calculating a combination score comprising the sum of the probabilities associated with the classifications of the maintenance events that are associated with the traversals.

12. The method as claimed in claim 11, wherein identifying, from the classified recorded maintenance events and the records of traversals of transport routes, a correlation between a given maintenance category and the transport routes traversed by propulsion systems during operational periods preceding maintenance events classified into the maintenance category further comprises:
for each transport route:
calculating the percentage contribution to a total score for the route of the combination scores for each of the maintenance categories combined with that route;
identifying the maintenance category with the highest percentage contribution; and
calculating a margin comprising a difference between the highest percentage contribution and the second highest percentage contribution.

13. The method as claimed in claim 12, wherein identifying, from the classified recorded maintenance events and the records of traversals of transport routes, a correlation between a given maintenance category and the transport routes traversed by propulsion systems during operational periods preceding maintenance events classified into the maintenance category further comprises:
associating each transport route to the identified maintenance category, wherein a strength of the association is proportional to the calculated margin for the transport route.

14. The method as claimed in claim 13, wherein identifying, from the classified recorded maintenance events and the records of traversals of transport routes, a correlation between a given maintenance category and the transport routes traversed by propulsion systems during operational periods preceding maintenance events classified into the maintenance category further comprises:
before associating transport routes to identified maintenance categories, filtering out transport routes for which at least one of:
the total number of traversals of the route, or
the calculated margin
is below a respective threshold value.

15. The method as claimed in claim 1, further comprising:
plotting the identified correlation on at least one geographic plot.

16. The method as claimed in claim 12, wherein each transport route comprises an origin location and a destination location, the method further comprising:
for a given location:
identifying all of the transport routes for which the location is either an origin or a destination;
for each maintenance category, calculating a percentage contribution of the maintenance category to a location score for the location as an average of the calculated percentage contributions of that maintenance category to the total scores of the identified routes;
identifying the maintenance category with the highest percentage contribution;
calculating a margin comprising the difference between the highest percentage contribution and the second highest percentage contribution; and
associating the location to the identified maintenance category, wherein a strength of the association is proportional to the calculated margin for the location.

17. The method of claim 1, wherein each record of the records of traversals of transport routes include an origin location, a destination location, and an actual path traversed between the origin location and the destination location.

18. A non-transitory computer program product comprising a computer readable medium, the computer readable medium having computer readable code embodied therein, the computer readable code being configured such that, on execution by a suitable computer or processor, the computer or processor is caused to perform a method as claimed in claim 1.

19. A management node for facilitating maintenance management of a propulsion system for a vehicle, the management node comprising a processor and a memory, the memory containing instructions, the processor being configured to read the instructions to enable performance of:

obtain, for each of a plurality of propulsion systems, records of maintenance events experienced by the propulsion system, and records of traversals of transport routes by the propulsion system during a period of propulsion system operation;

use a Machine Learning, ML, model to classify the recorded maintenance events into a plurality of maintenance categories;

identify, from the classified recorded maintenance events and the records of traversals of transport routes, a correlation between a given maintenance category and the transport routes traversed by propulsion systems during operational periods preceding maintenance events classified into the maintenance category, wherein the correlation is expressed as a probability that a causal link exists between traversing a given transport route and the next maintenance event for a propulsion system being in a given maintenance category; and perform, based on the identified correlation, at least one of maintenance planning, and/or transport route planning for the propulsion system.

* * * * *